United States Patent
Isomichi et al.

(10) Patent No.: US 6,938,171 B1
(45) Date of Patent: Aug. 30, 2005

(54) GATEWAY SYSTEM AND RECORDING MEDIUM

(75) Inventors: Kousei Isomichi, Minato (JP);
Hisayuki Gomyo, Minato (JP); Yasushi Makino, Minato (JP); Hiroshi Horiguchi, Minato (JP); Toyoaki Nakamoto, Kawasaki (JP); Takahiro Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 09/729,194

(22) Filed: Dec. 5, 2000

Related U.S. Application Data

(63) Continuation of application No. PCT/JP99/02472, filed on May 13, 1999.

(30) Foreign Application Priority Data

Jun. 12, 1998  (JP) .................................. 10-165660

(51) Int. Cl.[7] .............................................. H04L 9/00
(52) U.S. Cl. ..................................... 713/201; 713/153
(58) Field of Search ................................ 713/201, 202, 713/200, 153, 168, 182; 709/200, 229

(56) References Cited

U.S. PATENT DOCUMENTS

| | | | |
|---|---|---|---|
| 5,678,041 A | 10/1997 | Baker et al. | |
| 5,835,718 A | 11/1998 | Blewett | |
| 5,918,228 A * | 6/1999 | Rich et al. | 707/10 |
| 6,058,426 A * | 5/2000 | Godwin et al. | 709/229 |
| 6,163,536 A * | 12/2000 | Dunn et al. | 370/352 |

FOREIGN PATENT DOCUMENTS

| | | |
|---|---|---|
| JP | 7-319792 | 12/1995 |
| JP | 8-44643 | 2/1996 |
| JP | 9-26975 | 1/1997 |
| JP | 9-265456 | 10/1997 |

OTHER PUBLICATIONS

DeleGate, INTERFACE '99, pp. 130-146 and 238.

* cited by examiner

Primary Examiner—Matthew Smithers
(74) Attorney, Agent, or Firm—Staas & Halsy LLP

(57) ABSTRACT

The present invention relates to a gateway system which relays a request from a user for a service provided by another system and to a recording medium therefor. An object of the present invention is to provide a desired information service with a single user ID and password entered on the side of each user by transmitting a request from each user received by a gateway to another desired information provider server or gateway with the user ID and password being converted and by returning a response to the request to the user through a reverse conversion process when the response is received. The gateway system according to the present invention includes a unit which authenticates the user upon receiving the request from the user, a unit which makes the request using link information and authentication information corresponding to the requested service, and a unit which incorporates link information concerning the gateway system into link information included in returned data corresponding to the requested service.

15 Claims, 10 Drawing Sheets

GATEWAY SYSTEM AND RECORDING MEDIUM

This application is a continuing application, filed under 35 U.S.C. §111 (a), of International Application PCT/JP99/02472, filed May 13, 1999, it being further noted that priority is based upon Japanese Patent Application 10-165660, filed Jun. 12, 1998.

DESCRIPTION

1. Technical Field

The present invention relates to a gateway system which relays a request from a user for a service provided by another system and to a recording medium therefor.

2. Background Art

According to a conventional intranet (network within organization), user IDs and passwords used therein are managed separately from user IDs and passwords for world wide web (WWW) servers (for example, pay WWW servers provided with databases each storing large-scale information) of other networks linked to the intranet, and each of the WWW servers is accessed and a billing is processed by using a proper user ID and password.

Therefore, it is necessary to manage the user IDs and passwords for the intranet separately from those for other WWW servers, thus being inconvenient for users.

In order to eliminate this disadvantage, the present invention aims at providing a desired information service with a single user ID and password entered on the side of each user. According to the present invention, this is realized by transmitting a request from each user received by a gateway to another desired information provider server or gateway with the user ID and password being converted and by returning a response to the request to the user through a reverse conversion process when the response is received.

DISCLOSURE OF THE INVENTION

A description will be given, with reference to FIG. 1, of a system for eliminating the disadvantage.

According to FIG. 1, a gateway 1 receives a request from a user 7, transmits the received request to another gateway 8 or an information service provider 9, and transmits returned data to the requesting user 7. The gateway 1 includes a data transmission/reception unit 2, an authentication unit 3, a designation conversion unit 4, an authentication table 5, and a designation conversion table 6.

The data transmission/reception unit 2 receives and transmits data. The authentication unit 3 authenticates the request from the user 7 by referring to the authentication table 5.

The designation conversion unit 4 converts or inversely converts a designation by referring to the designation conversion table 6.

Next, a description will be given of an operation of the above-described system.

The request from the user 7 is supplied first to the authentication unit 3. The authentication unit 3 checks a user ID and password upon receiving the request from the user 7. If the result of the check by the authentication unit 3 is "OK", the designation of a service requested by the designation conversion unit 4 and a password are fetched from the designation conversion table 6, and the data is converted.

The data converted by the designation conversion unit 4 is supplied to the data transmission/reception unit 2. The data transmission/reception unit 2 transmits the data supplied from the designation conversion unit 4 to the gateway 8 or the information service provider 9. When data responding to the transmitted data is returned from the gateway 8 or the information service provider 9 to the data transmission/reception unit 2, the data transmission/reception unit 2 supplies the returned data to the designation conversion unit 4.

The returned data received by the data transmission/reception unit 2 is inversely converted by the designation conversion unit 4. The data inversely converted by the designation conversion unit 4 is supplied to the data transmission/reception unit 2. The data transmission/reception unit 2 receives the inversely converted data from the designation conversion unit 4 and transmits the inversely converted data to the requesting party of the user 7.

At this point, the user ID and password of the requesting user 7 are converted if entered in the authentication table 5, and if not, the user 7 is asked for reentry of the user ID and password or an error is detected.

In the conversion of the designation, the designation conversion unit 4 fetches a representative ID and representative password corresponding to the designation from the designation conversion table 6 and sets the user ID in the representative ID. Further, the designation conversion unit 4, when transmitting service information after receiving the representative ID and representative password, performs a billing by relating information on the representative ID including the user ID of the user 7 to the service information and collecting the information on the representative ID. Moreover, the designation conversion unit 4, when the reverse conversion is performed, also converts the designation included in control information, which is set in the returned data and includes the access data of the user 7 to a WWW server.

Therefore, the user can receive a desired information service with the single user ID and password entered on the user's side by transmitting the request from the user received by the gateway 1 to another desired information provider server or gateway with the user ID and password being converted and by returning the response to the request to the user through the reverse conversion process when the response is received.

BEST MODE FOR CARRYING OUT THE INVENTION

Next, a detailed description will be given, with reference to FIGS. 1 through 10, of embodiments of the present invention.

Figure 1:
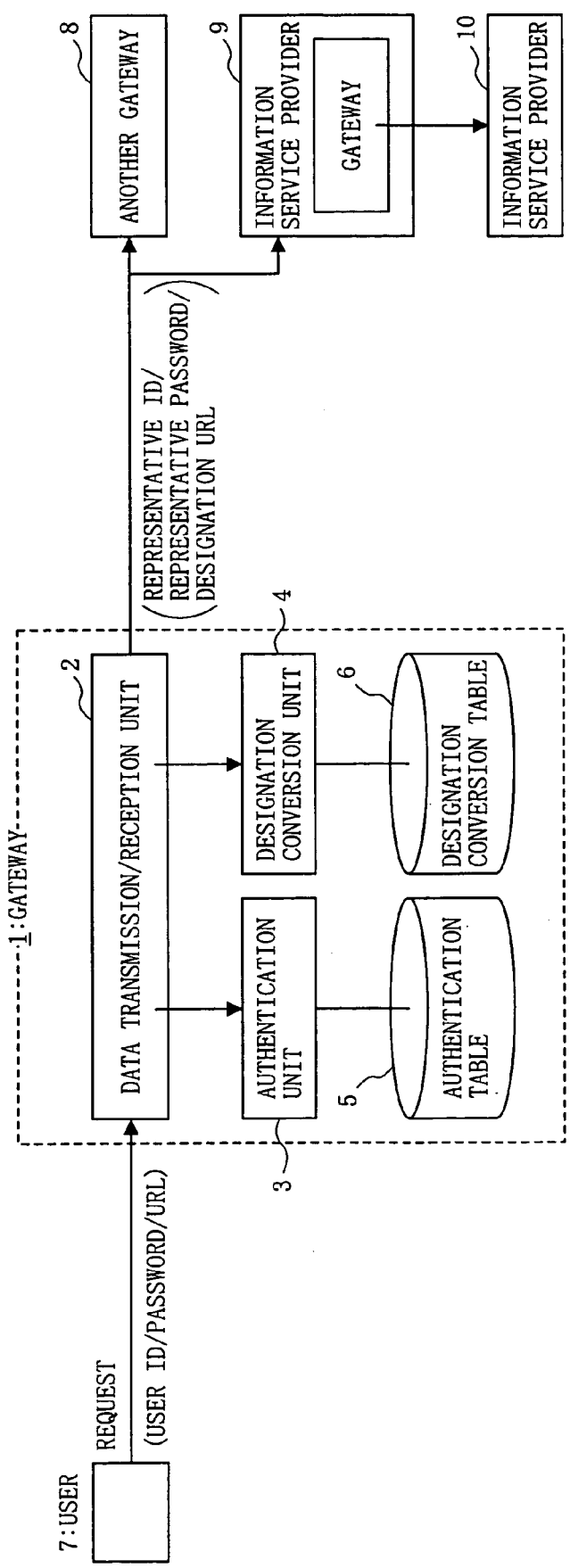
FIG. 1 is a block diagram of a system of the present invention.

FIG. 1 is a block diagram showing a system of the present invention.

According to FIG. 1, the gateway 1, which is connected to the Internet or local area networks (LANs), receives a request from the user 7, transmits the received request to the gateway 8 or the information service provider 9, and transmits returned data to the requesting user 7. The gateway 1 includes the data transmission/reception unit 2, the authentication unit 3, the designation conversion unit 4, the authentication table 5, and the designation conversion table 6.

According to FIG. 1, only the gateway 1 is connected between the user 7 and an information service provider 10. However, a plurality of the gateways 1 may be hierarchically connected therebetween. In such a case, each of the gateways 1 performs a conversion or reverse conversion process according to a later-described process shown in FIGS. 2 and 3 so that the user 7 can receive a desired service automatically with the single user ID and password by accessing a WWW server connected to any of the gateways 1 having the hierarchical structure.

The data transmission/reception unit 2 receives and transmits data. The authentication unit 3 checks the user ID and password included in the data (request) received from the user 7 by referring to the authentication table 5, and further checks a designation (authorized information).

The designation conversion unit 4 converts or inversely converts the designation including the user ID, a designation ID, a designation address (URL: Uniform Resource Locator) and the password by referring to the designation conversion table 6.

In the authentication table 5, authorized information (designation IDs), organization IDs and so on are entered in advance in correspondence to user IDs and passwords (see FIG. 4(a)). Designation URLs, representative IDs, representative passwords and so on are in advance entered in the designation conversion table 7 in correspondence to the designation IDs.

The gateway 8 has the same structure as the gateway 1. The information service provider 9 is a server which provides a variety of information and has a large-scale database. The information service provider 9 has the same inside structure as the gateway 1 and transmits a request for service to another information service provider 10.

The information service provider 10 is a server which provides a variety of information.

Next, a description will be given, according to the order of the flowcharts of FIGS. 2 and 3, of an operation of the whole system of FIG. 1.

Figure 2:
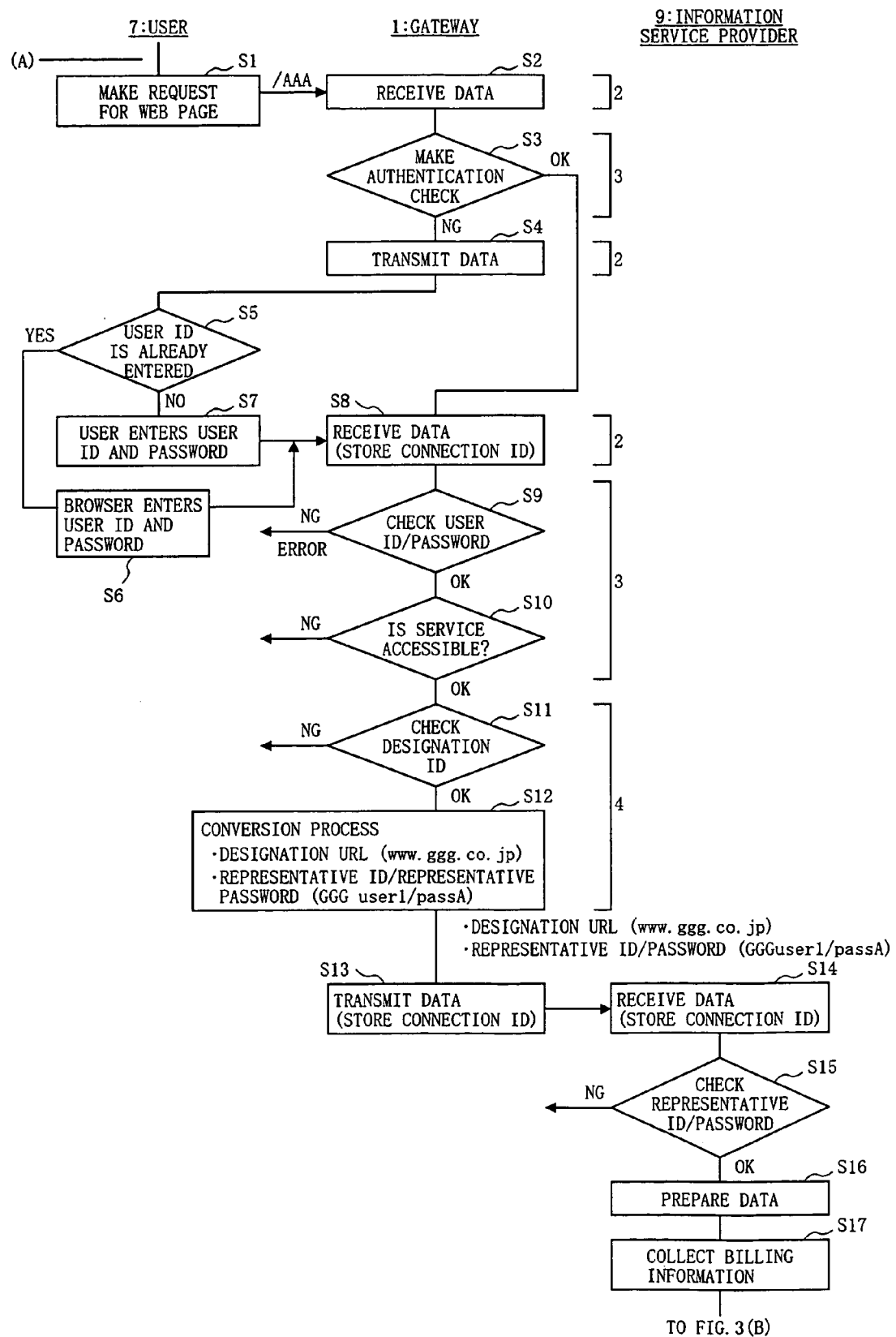
FIG. 2 is a flowchart illustrating an operation of the present invention.
Figure 3:
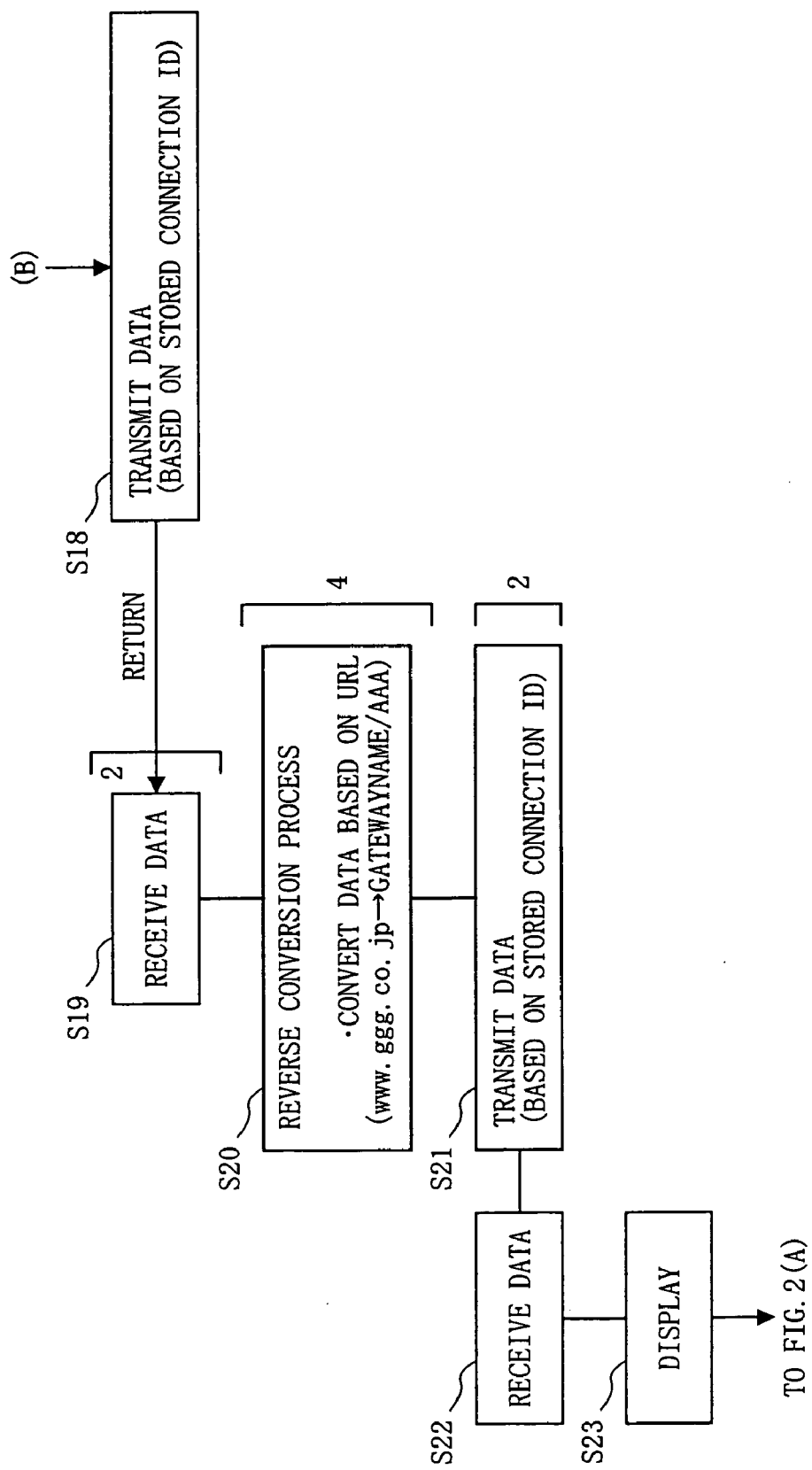
FIG. 3 is a flowchart illustrating the operation of the present invention.

FIGS. 2 and 3 are flowcharts illustrating the operation of the present invention. According to FIG. 2, a Web page request is made in step S1. This step transmits the Web page request (/AAA) for a Web page selected from a list, which Web page the user 7 wishes to have.

The data is received in step S2. In this step, the data transmission/reception unit 2 of the gateway 1 receives the Web page request data transmitted in step S1.

An authentication check is made in step S3. In this step, the authentication unit 3 checks whether the user ID and password are included in the data received in step S2.

If the result of the authentication check in step S3 is "NG", that is, the user ID and password are not included in the data, a message requesting entry of the user ID and password is transmitted in step S4.

On the other hand, if the result of the authentication check in step S3 is "OK", that is, if the user ID and password are included in the data, the process proceeds to step S8.

In step S5, it is determined whether the user ID is already entered. In this step, it is determined whether the user ID is already entered into a browser on the side of the user 7.

If the determination result of step 5 is "YES", the user has already entered the user ID and password into the browser opened on a screen. Therefore, the browser sets the user ID and password in control data output at the time of the Web page request and transmits the user ID and password to the gateway 1.

On the other hand, if the determination result of step S5 is "NO", the user has not entered the user ID and password into the browser opened on the screen. Therefore, the user enters the user ID and password in a predetermined region on the screen and transmits the user ID and password to the gateway 1. At this point at least below-described information is transmitted:

User ID/Password: ex. user1/pass1

URL: ex. a gateway name and a designation ID (/AAA)

In step S8, the above-described information is received. At this point, the data transmission/reception unit 2 of the gateway 1 stores a connection ID. Hereafter, the transmission and reception of the data (packet) (for example, data transmission in step S13) are performed using the connection ID.

In step S9, the user ID and password are checked. In this step, it is checked, by referring to the later-described authentication table 5 of FIG. 4(a), whether a user ID and password corresponding to the user ID and password included in the data received in step S8 are entered in the authentication table 5.

If the check result of step S9 is "OK", the process proceeds to step S10.

If the check result of step S9 is "NG", an error message is transmitted to ask the user 7 for reentry of the user ID and password, and "ERROR" is displayed when a number of reentries exceeds a predetermined number of times.

In step S10, it is checked whether a service is accessible. In this step, it is checked, by referring to the authentication table 5 of FIG. 4(a), whether the requested service, for example, "/AAA", is entered and authorized in the authorized information, namely, the designation ID of an entry corresponding to the user ID and password of step S9.

If the check result of the step S10 is "OK", the process proceeds to step S11.

If the check result of the step S10 is "NO", it is determined that the requested service is not entered and authorized in the authentication table 5, so that an "NG" message is transmitted to the user 7 and it is displayed on the screen that the requested service is not authorized.

In step S11, the designation ID is checked. In this step, since the check result of step S10 is "OK" and the requested service is entered in the authorized information list of the authentication table 5 of FIG. 4(a), it is checked whether the desired designation ID (authorized information) is entered in the designation conversion table 6 of FIG. 4(b).

If the check result of step S11 is "OK", the process proceeds to step S12.

If the check result of step S11 is "NO", the designation ID is not entered. Therefore, an "NG" message is transmitted to be displayed on the screen to notify the user 7 that the designation ID is not entered.

In step S12, a conversion process is performed. In this step, the check result of step S11 is "OK" and it is determined that the authorized designation ID is entered in the designation conversion table 6 of FIG. 4(b). Therefore, after Designation URL: ex. www.ggg.co.jp
Representative ID/Representative password:
ex. GGG+UserID+Option/PassA are fetched from the designation conversion table 6, the user ID of "user1" is embedded into the above-described information to form:
Designation URL: ex. www.ggg.co.jp
Representative ID/Representative password:
ex. GGG. User1/PassA Step S13 is a data transmission process. In step S13, data in which the designation URL, representative ID and representative password formed in step S12 are set is transmitted.

In step S14, the information service provider 9 having the designation URL receives the data transmitted in step S13 and stores the connection ID for returning data.

In step S15, the representative ID and representative password received in step S14 are checked.

If the check result of step S15 is "OK", the process proceeds to step S16.

If the check result of step S15 is "NO", an "NG" message is transmitted to the data transmitter.

Step S16 is a data preparation process. In step S16, data for which a request for service has been made is prepared.

In step S17, billing information is collected. In this step, necessary billing information such as the representative ID and the contents of the request for service received in step S14 is prepared to be stored. Since the user ID of the service requesting user 7 and the organization ID of an organization to which the user 7 belongs are embedded into the representative ID, it is possible to perform a billing by the user or the organization.

According to FIG. 3, step S18 is a data transmission process. In step S18, the data, namely, the data for which the request for service has been made, is transmitted to the gateway 1 based on the connection ID stored in step S14.

In step S19, the gateway 1 receives the data transmitted in step S18.

Step S20 is a reverse conversion process. In step S20, the reverse conversion process, which is reverse to the above-described conversion process performed in step S12 of FIG. 2, is performed. In step S20, data conversion is performed based on a URL. For example, "www.ggg.co.jp" is inversely converted into "gatewayname/AAA".

Step S21 is a data transmission process. In this step, the data is transmitted to the requesting user 7 based on the connection ID stored in step S8.

In step S22, the user 7 receives the data transmitted in step S21.

Step S23 is a display process. Then, the process returns to step S1 of FIG. 2(A) and the above-described steps are repeated.

As described above, the user 7 has only to make the request to the gateway 1 for the data, and the gateway 1 checks the user ID/password/authorized information by referring to the authentication table 5 of FIG. 4(a) and automatically converts the user ID/password/authorized information, when the check result is "OK", into the designation of the service provider, the representative ID into which the user ID and the like are embedded, and the representative password by referring to the designation conversion table 6 of FIG. 4(b). The designation of the service provider, the representative ID and the representative password are then transmitted to the designation of the information service provider 9 or 10.

The information service provider 9 or 10 prepares and returns the data for the service provided, and collects the billing information such as the representative ID and the name of the service provided. The gateway 1 inversely converts the designation when receiving the returned data and transmits the data to the requesting user 7 so that the user 7 can receive the service with the data shown on the screen. This allows the user 7, who is conscious only of the gateway 1, to automatically receive the service provided from the information service provider 9 or 10 with the single user ID and password. This also allows the information service provider 9 or 10 to perform, by collecting the representative ID and the name of the service, the billing for the provided service by the user ID or the organization ID of the organization to which the user belongs.

Figure 4:
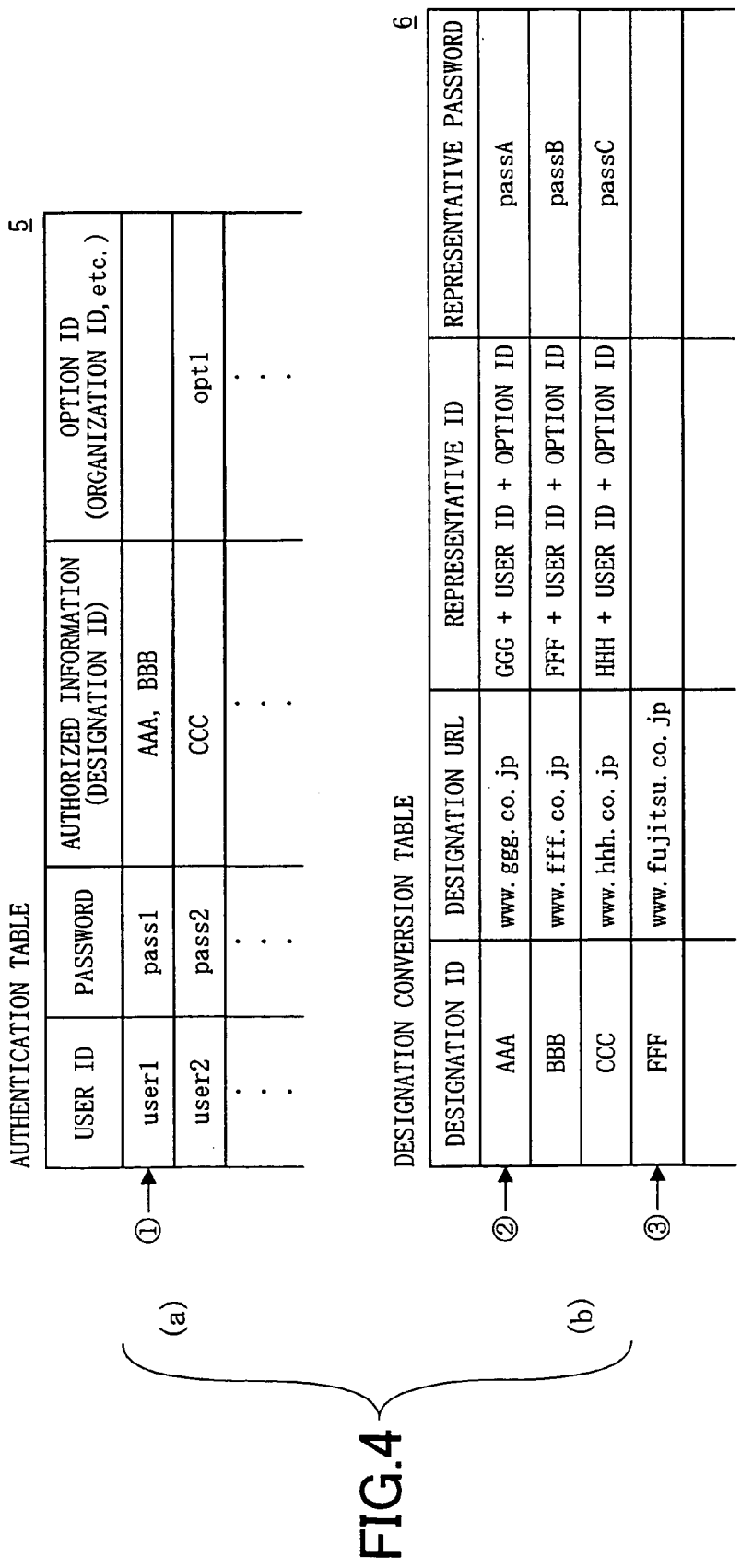
FIG. 4 shows examples of tables according to the present invention.

FIG. 4 shows examples of the tables according to the present invention.

FIG. 4(a) shows an example of the authentication table. As shown therein,
User ID:
Password:
Authorized information (designation ID):
Option ID (organization ID or the like):
Others: are entered and related to one another in the authentication table 5.

Here, the user ID is an ID assigned only to the user 7 of FIG. 1. The password is a secret password for each user ID. The authorized information (designation ID) is information (designation ID) on an authorized service. The option ID is the organization ID assigned only to the organization to which the user 7 belongs.

The above-described checks in steps S9, S10, and S11 can be made by entering the above-described information in the authentication table 5. The entry of data in, alteration of data entered in, and deletion of entered data from the authentication table 5 can be made easily by the respective operations of addition, alteration, and deletion.

FIG. 4(b) shows an example of the designation conversion table. As shown therein, Designation ID:
Designation URL:
Representative ID: ex. GGG+UserID+OptionID
Representative password:
Others: are entered and related to one another in the designation conversion table 6.

Here, the designation ID corresponds to the authorized information (designation ID) of the authentication table 5 of FIG. 4(a). The designation URL is the URL (address) of a designation, and the representative ID includes a user ID and the organization ID of an organization to which each user belongs. The representative password, which includes a user ID, is a password assigned to a given group, organization or gateway.

By entering the above-described information in the designation conversion table 6 as described above, the conversion of the designation and password and the reverse conversion of the designation can be made automatically with reference to the designation conversion table 6 when the above-described conversion process of step S12 of FIG. 2 and reverse conversion process of step S20 of FIG. 3 are performed.

The entry of data in, alteration of data entered in, and deletion of entered data from the designation conversion table 6 can be made easily by the respective operations of addition, alteration, and deletion.

Figure 5:
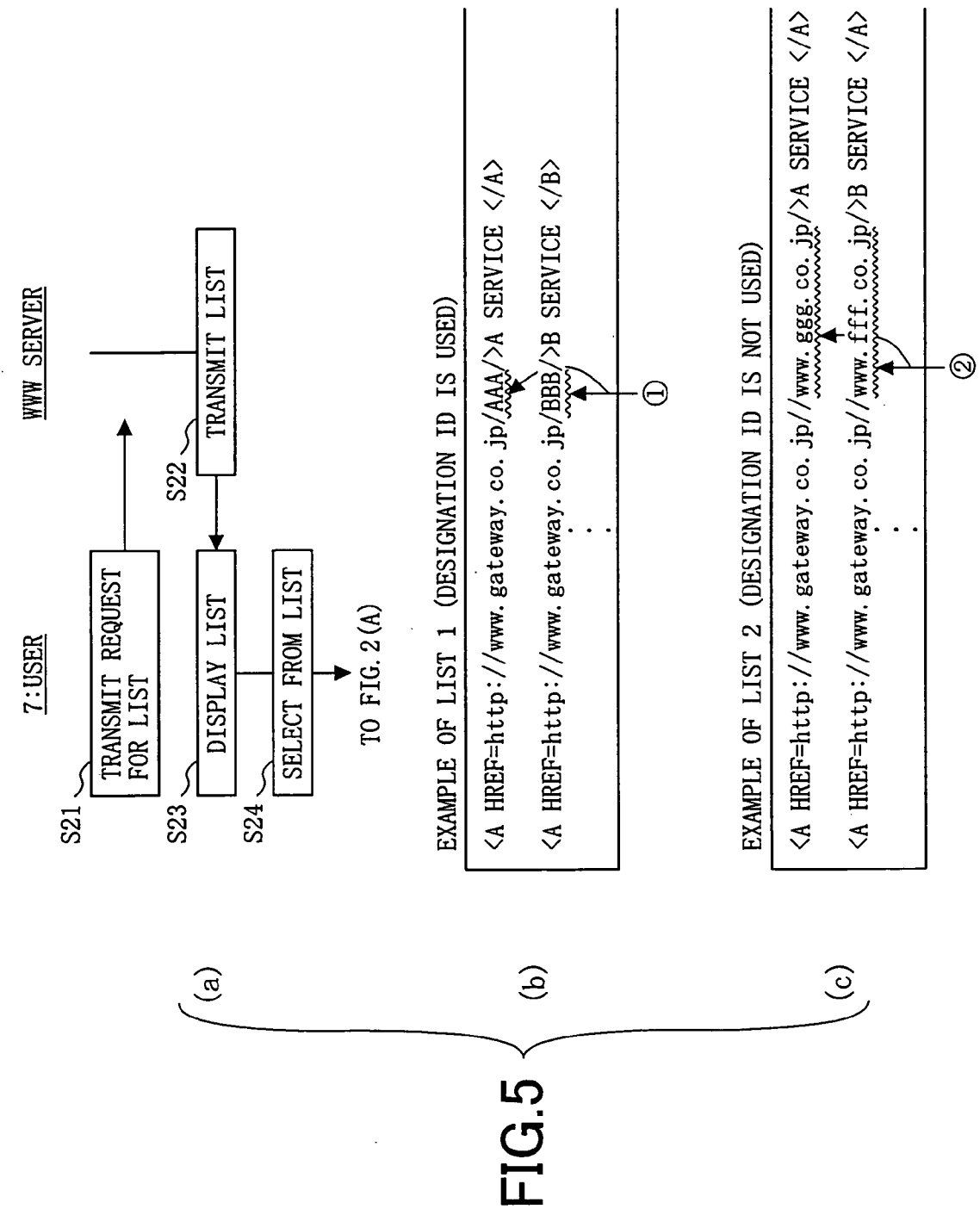
FIG. 5 is a diagram illustrating an operation of the present invention.

FIG. 5 illustrates an operation (selection from the list) of the present invention. This describes the details of steps to be taken to make a selection from the list of services provided. The list is downloaded from the gateway 1 to the user 7 so as to be displayed on the screen before the above-described Web page request is made in step S1 of FIG. 2.

FIG. 5(*a*) shows a flowchart. According to FIG. 5(*a*), the user 7 transmits a list request in step S21. In step S22, the list is transmitted. That is, a WWW server receives the list request transmitted in step S21 and transmits the requested list to the user 7 (the browser of the user 7).

In step S23, the list is displayed. That is, the list transmitted in step S22 is displayed on the browser opened on the screen on the side of the user 7. The list is displayed, for example, as shown in later-described FIG. 5(*b*) or 5(*c*).

In step S24, selection is made from the list. In this step, the user operates a mouse to select one service from the list of FIG. 5(*b*) or 5(*c*) on the screen. Then, the process proceeds to above-described step S1 of FIG. 2.

Thus, the user 7 is allowed to make the list request to the WWW server and select the one service from the list of FIG. 5(*b*) or 5(*c*) on the screen. FIG. 5(*b*) shows an example 1 of the list, in which the designation ID is used. As shown therein, designation IDs such as "AAA" and "BBB" are used.

FIG. 5(*c*) shows an example 2 of the list, in which the designation ID is not used. As shown therein, designation URLs are provided instead of the designation IDs.

Figure 6:
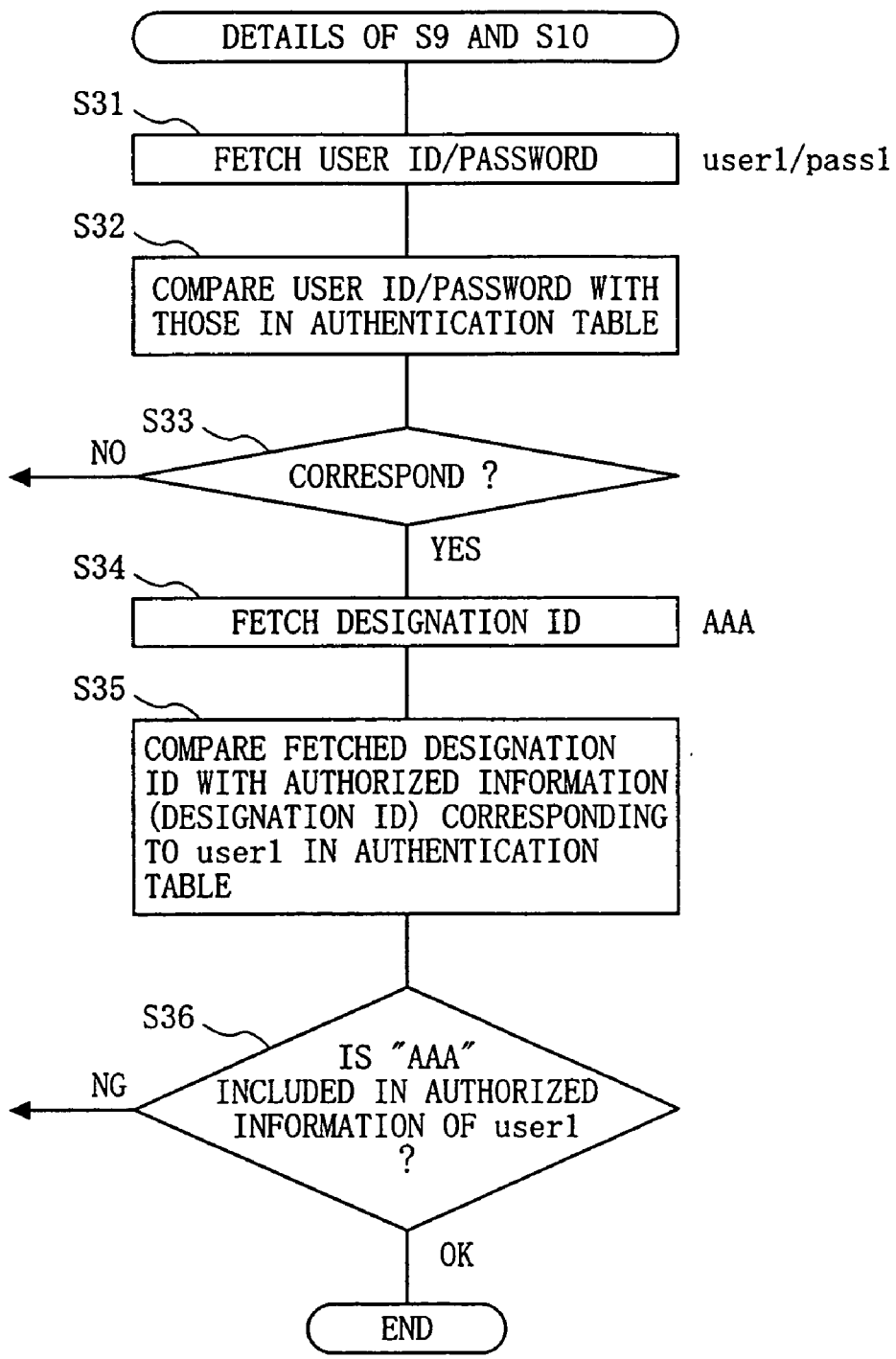
FIG. 6 is a flowchart illustrating a detailed operation of the present invention.

FIG. 6 is a first flowchart illustrating a detailed operation of the present invention.

This flowchart illustrates a detailed operation of above-described steps S9 and S10 of FIG. 2.

According to FIG. 6, in step S31, the user ID and password are fetched. In this step, the authentication unit 3 fetches, for example, "user1/pass1", which is noted on the right of step S31 in FIG. 6, as the user ID and password from the data received from the user 7.

In step S32, a comparison is made between the fetched user ID and password and user IDs and passwords in the authentication table 5. In this step, the user ID and password are compared with, for example, a user ID and password "user1/pass1" entered in the authentication table 5 of FIG. 4(*a*).

In step S33, it is determined whether the fetched user ID and password correspond to the user ID and password entered in the authentication table 5. If correspondence is found as a result of step S33, the process proceeds to step S34.

If no correspondence is found as a result of step S33, an "NG" message is transmitted to the user 7 and it is displayed on the screen that the user ID and password entered are wrong so as to ask for reentry of the user ID and password. If wrong user IDs and passwords are entered the predetermined number of times, the process is terminated as an error.

In step S34, the designation ID is fetched. In this step, since the check result of the user ID and password is "OK", the designation ID "AAA", for example, is fetched from the data.

In step S35, the fetched designation ID is compared with authorized information, namely, a designation ID corresponding to "user1" in the authentication table. In this step, the designation ID "AAA" fetched in step S34 is compared with authorized information, namely, a designation ID "AAA, BBB" entered in the authentication table of FIG. 4(*a*), which designation ID corresponds to the user ID, for example, "user1" approved through steps S31 through S33. In this case, "AAA" exists correspondingly in both of the designation IDs.

In step S36, it is determined whether "AAA" is included in the authorized information of "user1". In this case, since "AAA" is included therein, the determination result of step S36 is "OK". This means that all of the user ID, password and designation ID are authenticated. On the other hand, if the determination result of step S36 is "NO", an "NG" message is transmitted to be displayed on the screen to notify the user 7 of the above result.

Thus, it is possible to make the checks on the user ID, password and designation ID included in the data received from the user 7 by referring to the above-described authentication table 5 of FIG. 4(*a*).

Figure 7:
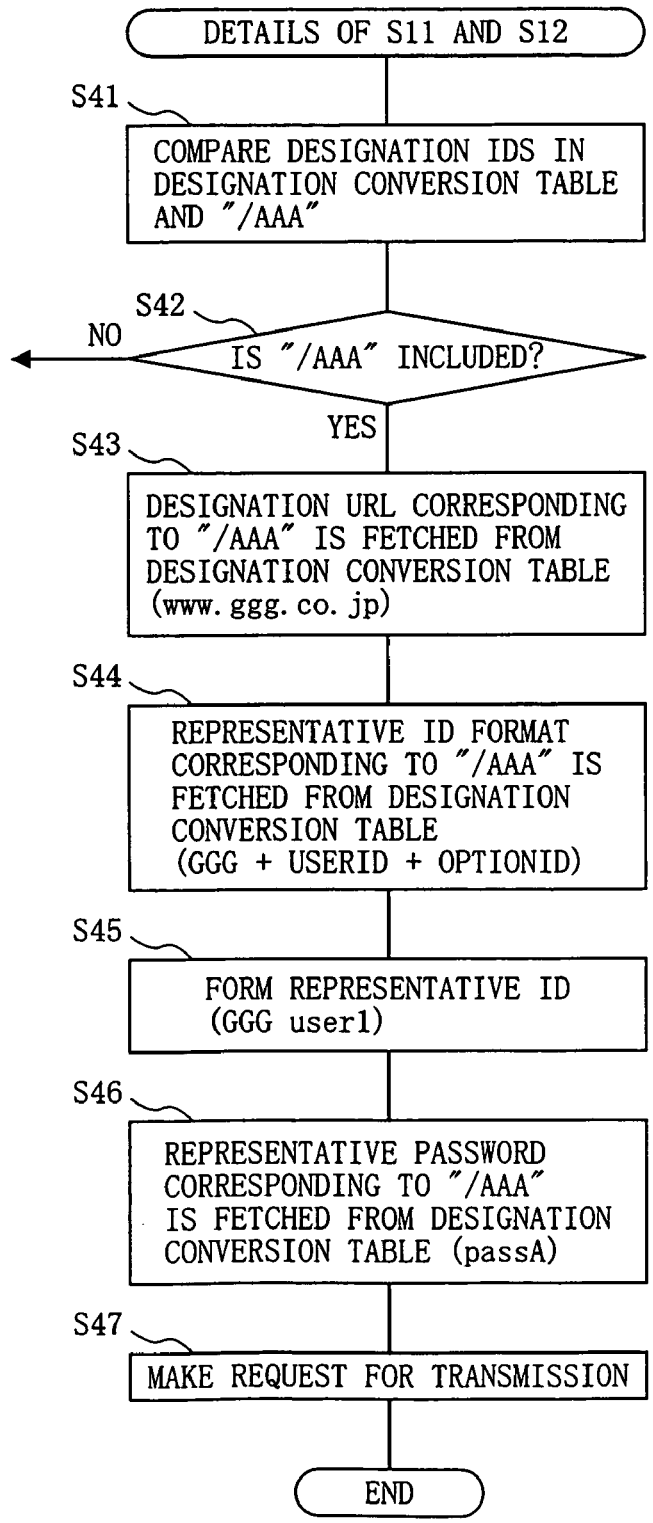
FIG. 7 is a flowchart illustrating a detailed operation of the present invention.

FIG. 7 is a second flowchart illustrating a detailed operation of the present invention.

This flowchart illustrates a detailed operation of above-described steps S11 and S12 of FIG. 2.

According to FIG. 7, in step S41, a comparison is made between designation IDs in the designation conversion table and "/AAA". In this step, for example, the designation ID "AAA" fetched in step S34 of FIG. 6 is compared with designation IDs entered in the designation conversion table 6 so as to see if there is a designation ID corresponding to the designation ID "AAA" in the designation conversion table 6.

In step S42, it is determined whether "/AAA" is included in the designation IDs in the designation conversion table 6. If it is determined in step S42 that "/AAA" is included therein, the process proceeds to step S43.

If it is determined in step S42 that "/AAA" is not included therein, the determination result of step S42 is "NG" and an error is detected. In step S43, a designation URL corresponding to "/AAA" is fetched from the designation conversion table. In this step, the designation URL "www.ggg.co.jp" is fetched from the entries of FIG. 4(*b*).

In step S44, a representative ID format corresponding to "/AAA" is fetched from the designation conversion table. In this step, the representative ID format "GGG+UserID+OptionID" is fetched from the entries of FIG. 4(*b*).

In step S45, the representative ID is formed. In this step, the user ID "user1" is embedded into the representative ID format fetched in step S44 to form the representative ID "GGG. user1".

In step S46, a representative password corresponding to "AAA" is fetched from the designation conversion table. In this step, the representative password "passA" is fetched from the entries of FIG. 4(*b*).

Step S47 is a transmission request process.

Thus, it is possible to automatically form, by referring to the designation conversion table 6, the designation URL to which the data is transmitted and the representative ID and representative password which replace the user ID and password, respectively. The data can be transmitted by replacing (changing) the original designation URL, user ID and password with the automatically formed designation URL, representative ID and representative password.

Figure 8:
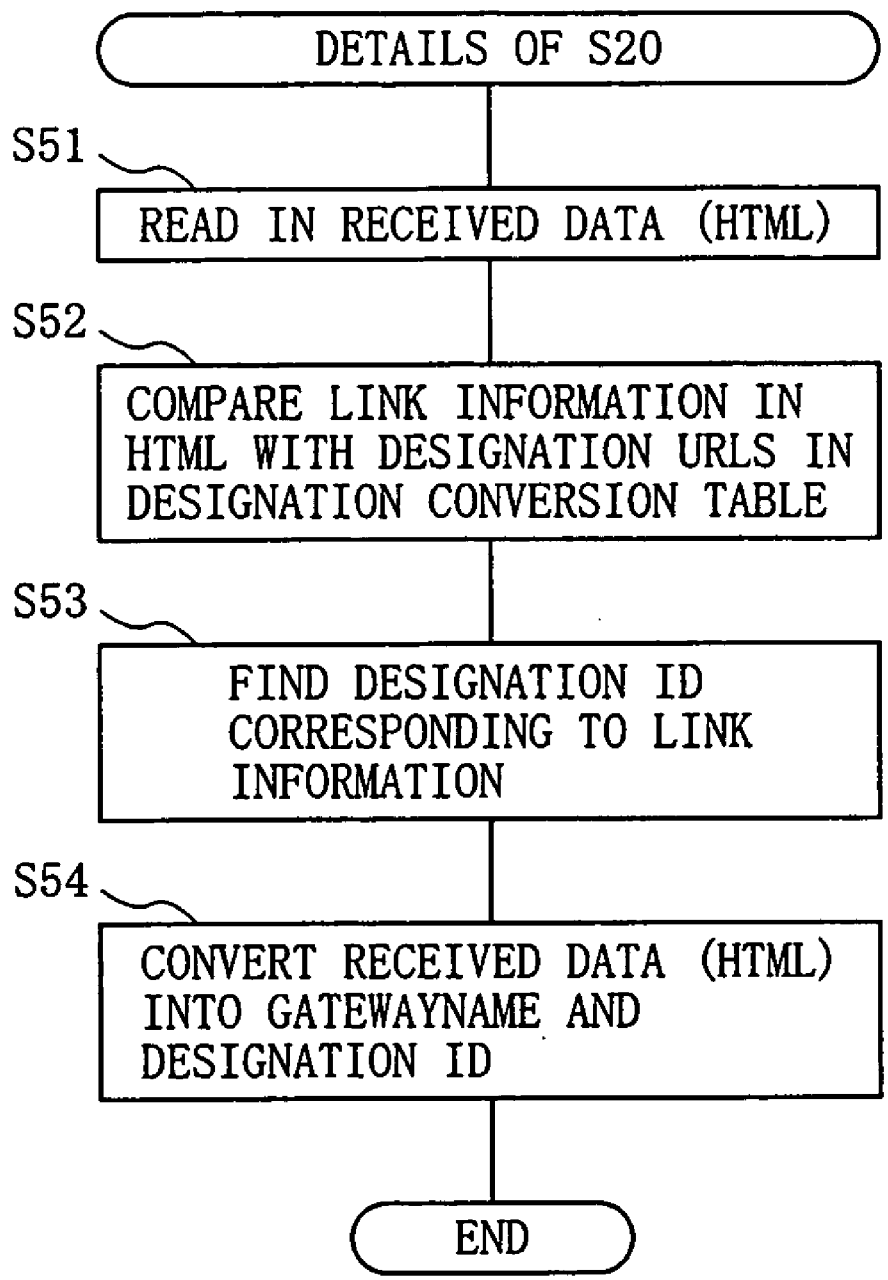
FIG. 8 is a flowchart illustrating a detailed operation of the present invention.

FIG. 8 is a third flowchart illustrating a detailed operation of the present invention. This flowchart illustrates a detailed operation of the above-described step S20 of FIG. 3.

According to FIG. 8, in step S51, the received data (HTML) is read in.

In step S52, link information in the HTML is compared with designation URLs in the designation conversion table. The link information (URL) "www.ggg.co.jp" fetched from the received HTML data, for example, is compared with the above-mentioned designation URLs in the designation conversion table 6 of FIG. 4(*b*).

In step S53, a designation ID corresponding to the link information is found. In this step, if it is determined, as a result of the comparison made in step S52, that the link information corresponds to, for example, "www.ggg.co.jp" in the designation conversion table 6 of FIG. 4(*b*), the designation ID "AAA" in the head of the entry is found.

In step S54, the received data (HTML) is converted into a gateway name and a designation ID, for example, "Gatewayname+AAA".

Thus, the designation ID corresponding to the URL fetched from the received data (HTML) is found by referring to the designation conversion table 6, and inversely converted into and replaced with the gateway name and the designation ID so that the data is transmitted to the requesting user 7 based on the connection ID stored in step S8.

By this, the user 7 recognizes that the data is returned from the gateway 1, to which the request for the data is made.

Next, a detailed description will be given, with reference to FIGS. 9 and 10, of an embodiment in which the present invention is applied to so-called "Cookie". Here, "Cookie" is a function of (software for) a server to cause a machine on the side of a client to retain information native to the client. "Cookie" is written in a line marked with ★ in the control information of data as shown in later-described FIG. 10(*c*). Since "Cookie" includes designation information (address information), the designation conversion unit 4 similarly performs the reverse conversion in the above-described gateway 1 of the present invention.

The detailed description will be given in the following.

Figure 9:
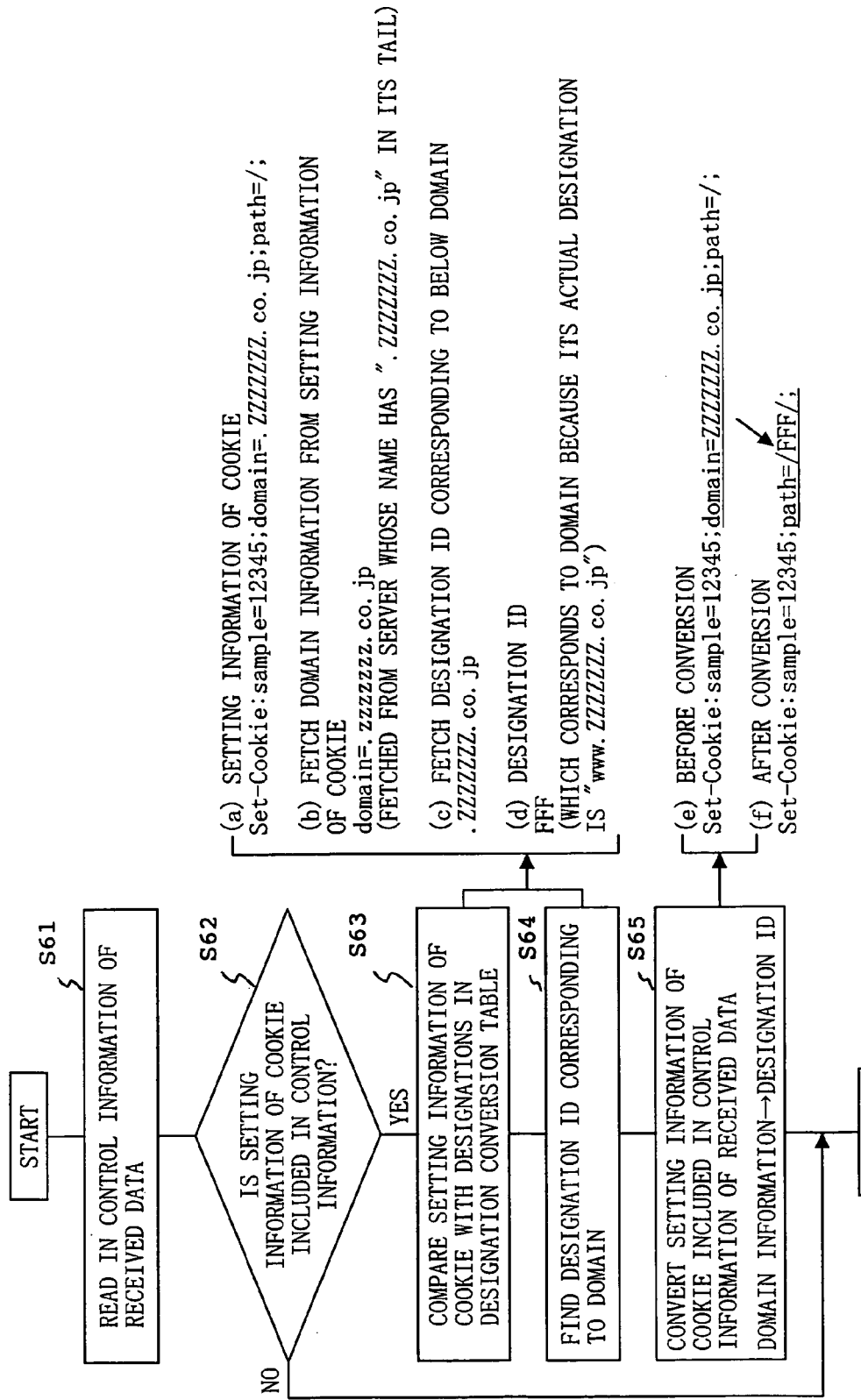
FIG. 9 is a flowchart of a conversion process of setting information of "Cookie" according to the present invention.

FIG. 9 shows a flowchart of a conversion process of the setting information of "Cookie" according to the present invention.

According to FIG. 9, in step S61, the control information of received data is read in. In step S62, it is determined whether the setting information of "Cookie" is included in the control information. In this step, it is determined whether the setting information of "Cookie" such as Set-Cookie: sample=12345;domain=.zzzzzzz.co.jp;path=/;, as shown in (a) noted on the right of the flowchart in FIG. 9, is written. If the determination result of step S62 is "YES", the process proceeds to step S63. If the determination result of step S62 is "NO", the process is terminated.

In step S63, the setting information of "Cookie" is compared with the designations in the designation conversion table 6.

In step S64, a designation ID corresponding to the domain of the setting information is found. In steps S63 and S64, for example, as noted on the right of steps S63 and S64 in FIG. 9, domain information shown in (b) is first fetched from the setting information of "Cookie" shown in (a), which information is read in through steps S61 and S62, and then, the domain shown in (c) is fetched from the domain information.

Next, as shown in (d), the designation ID, "FFF" in this case, corresponding to the domain shown in (c) is fetched by referring to the designation conversion table 6.

In step S65, the setting information of "Cookie" included in the control information of the received data is converted. In this step, the underlined domain information in the setting information of "Cookie" before conversion shown in (e) is converted into and replaced with an underlined designation ID in the converted setting information of "Cookie" shown in (f) based on the designation ID "FFF" found in step S64. (This process corresponds to the above-described reverse conversion.)

Thus, the setting information of "Cookie" before conversion shown in (e), which information is included in the received data, is automatically converted into the converted setting information of "Cookie" shown in (f). This conversion can be performed together with the reverse conversion of the designation marked with ☆ in FIG. 10, which reverse conversion is previously described with reference to FIG. 1 or 8.

Figure 10:
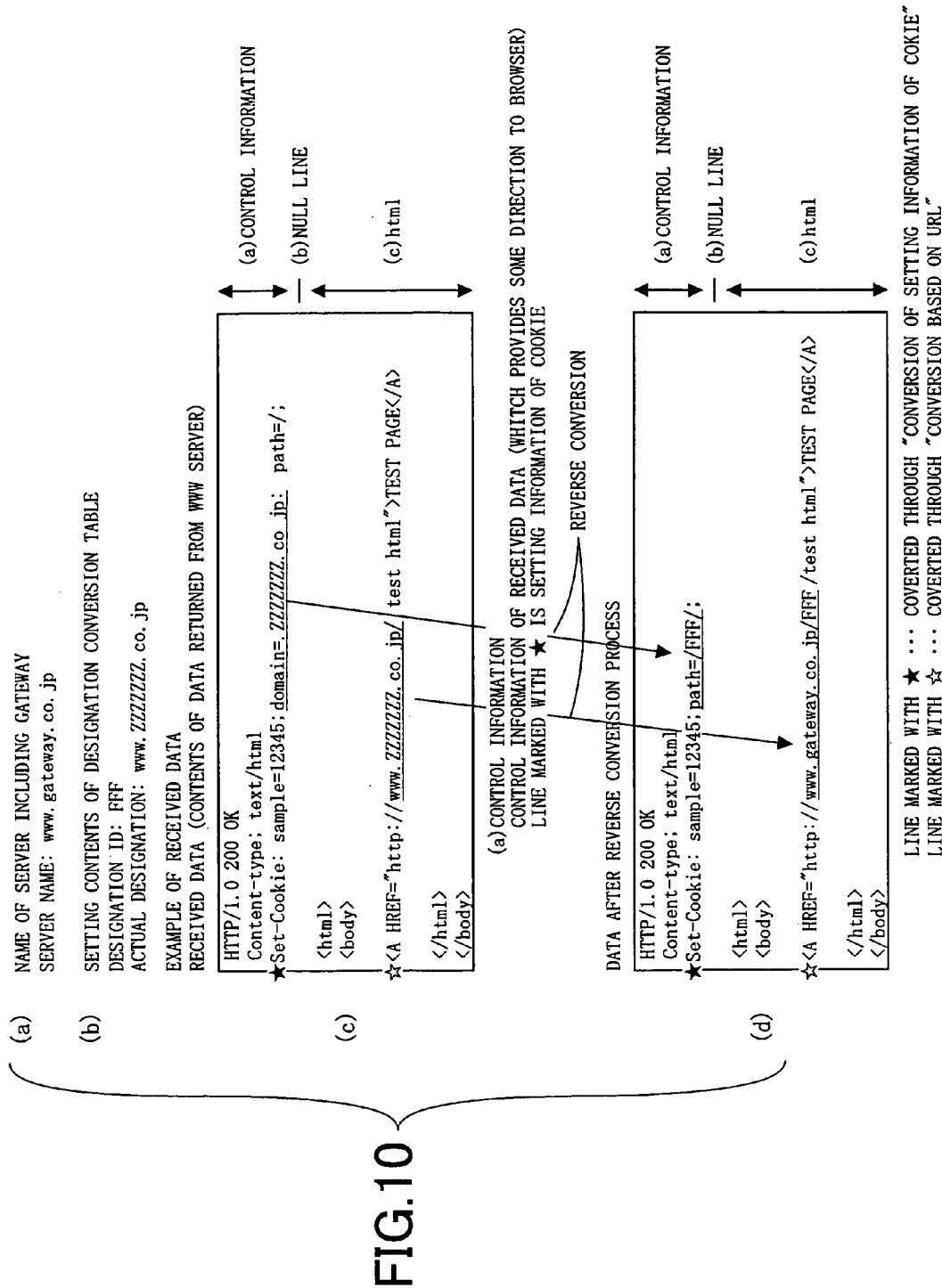
FIG. 10 is a diagram illustrating an operation according to another embodiment of the present invention.

FIG. 10 is a diagram illustrating another operation of the present invention. FIG. 10 shows an example according to the above-described flowchart of FIG. 9. FIG. 10(*a*) shows an example of the name of the server including the gateway. Here, the name is as follows:

Server name: www.gateway-Server.co.jp

FIG. 10(*b*) shows an example of the setting contents of the designation conversion table 6. Here, the setting contents are set as follows:

Designation ID: FFF (of FIG. 4(*b*))

Actual designation: www.ZZZZZZZ.co.jp

FIG. 10(*c*) shows an example of the received data. FIG. 10(*c*) shows an example of the contents of data returned from a WWW server (included in the information service provider 9) to the gateway 1. The line marked with ★ in the control information (a) in FIG. 10(*c*) is the setting information of "Cookie", which is identical to the setting information thereof shown in FIG. 9(*a*). A line marked with ☆ is the information described with reference to FIGS. 1 through 8.

FIG. 10(*d*) shows data after the reverse conversion process. The data is obtained after the conversion performed in accordance with above-described steps S63 through S65. In the data, a line marked with ★ is the converted setting information of "Cookie", and a line marked with ☆ is the information after the above-described reverse conversion described with reference to FIGS. 1 through 8.

As described above, according to the present invention, the request from the user 7 received by the gateway 1 is transmitted to another desired information provider server or gateway with the user ID and password being converted. Further, when the response to the request is received, the response is returned to the user 7 through the reverse conversion process and at the same time, the designation included in the control information including access data of the user to the WWW server is inversely converted. Therefore, the user 7 can receive a desired information service with the single user ID and password entered on the user's side.

Thus:

(1) although, conventionally, user IDs and passwords for different WWW servers or WWW servers having different billing systems have to be managed separately, the present invention allows the user 7 to automatically access a plurality of WWW servers having different billing systems through the gateway 1 with the single user ID and password;

(2) control information including access information of the user 7 to a WWW server (for example, the setting information of "Cookie"), which control information is included in received data, can be utilized effectively with the gateway 1 according to the present invention automatically inversely converting a designation included in the received data; and (3) with a plurality of the gateways 1 according to the present invention being provided between the user 7 and an information service provider (WWW server) in a hierarchical structure, the user 7 can also automatically access a desired WWW server with the single user ID and password to receive a desired service if each of the gateways 1 similarly performs the conversion and reverse conversion.

What is claimed is:

1. A gateway system relaying a request from a user for a service provided by another system, the gateway system comprising:

an authentication unit which receives the request and authenticates the user;

a service request unit which makes the request to said another system on behalf of the user based on a result of an authentication by said authentication unit by accessing said another system via an Internet using a URL specifying said another system, using link information and authentication information corresponding to the requested service; and an information link unit which incorporates link information concerning the gateway system into link information included in returned data corresponding to the request.

2. The gateway system as claimed in claim 1, characterized by having a plurality of systems each including said authentication unit, said service request unit, and said information link unit, the systems being provided in a hierarchical structure.

3. The gateway system as claimed in claim 1, characterized in that:

said service request unit comprises a table in which accessible service information retained by the user is entered, and makes the request for a service on behalf of the user when the service is accessible to the user.

4. The gateway system as claimed in claim 1, characterized in that:

said service request unit comprises a table in which an option ID serving as a billing unit is entered in correspondence to the system providing the service, and transmits the option ID in making the request.

5. The gateway system as claimed in claim 1, characterized in that:

said information link unit converts the link information included in the returned data into the link information concerning the gateway system, the link information included in the returned data being included in control information set in the returned data, the control information including access information of the user to a WWW server.

6. The gateway system as claimed in claim 2, characterized in that:

said information link unit converts the link information included in the returned data into the link information concerning the gateway system, the link information included in the returned data being included in control information set in the returned data, the control information including access information of the user to a WWW server.

7. The gateway system as claimed in claim 3, characterized in that:

said information link unit converts the link information included in the returned data into the link information concerning the gateway system, the link information included in the returned data being included in control information set in the returned data, the control information including access information of the user to a WWW server.

8. The gateway system as claimed in claim 4, characterized in that:

said information link unit converts the link information included in the returned data into the link information concerning the gateway system, the link information included in the returned data being included in control information set in the returned data, the control information including access information of the user to a WWW server.

9. A computer-readable recording medium:

having a program which causes a computer to execute the operations of:

authenticating a user upon receiving a request for a service from the user;

making the request to said another system on behalf of the user based on a result of authenticating the user by accessing said another system via an Internet using a URL specifying said another system, using link information and authentication information corresponding to the requested service; and incorporating link information concerning a gateway system into link information included in returned data corresponding to the request.

10. The computer-readable recording medium as claimed in claim 9, wherein making the request to said another system includes use of a table in which accessible service information retained by the user is entered, and making the request for a service on behalf of the user when the service is accessible to the user.

11. The computer-readable recording medium as claimed in claim 9, wherein making the request to said another system includes use of a table in which an option ID serving as a billing unit is entered in correspondence to a system providing the service, and transmitting the option ID in making the request.

12. The computer-readable recording medium as claimed in claim 9, wherein incorporating the link information includes converting the link information included in the returned data into the link information concerning the gateway system, the link information included in the returned data being included in control information set in the returned data, the control information including access information of the user to a WWW server.

13. The computer-readable recording medium as claimed in claim 10, wherein incorporating the link information includes converting the link information included in the returned data into the link information concerning the gateway system, the link information included in the returned data being included in control information set in the returned data, the control information including access information of the user to a WWW server.

14. The computer-readable recording medium as claimed in claim 11, wherein incorporating the link information includes converting the link information included in the returned data into the link information concerning the gateway system, the link information included in the returned data being included in control information set in the returned data, the control information including access information of the user to a WWW server.

15. A method of relaying a request for a service provided by another system, comprising:

requesting for the service provided by said another system on behalf of an authenticated user upon receiving the user's request including a URL specifying said another system; and accessing said another system using the URL, link information and authentication information corresponding to the requested service and incorporating the link information in data returned to the user.

* * * * *

UNITED STATES PATENT AND TRADEMARK OFFICE
CERTIFICATE OF CORRECTION

PATENT NO. : 6,938,171 B1  
APPLICATION NO. : 09/729194  
DATED : August 30, 2005  
INVENTOR(S) : Kousei Isomichi et al.

It is certified that error appears in the above-identified patent and that said Letters Patent is hereby corrected as shown below:

First Page, Column 2 (Attorney, Agent or Firm), Line 1, delete "Halsy" and insert -- Halsey -- therefor.
Column 12, Line 6, after "medium" delete ":".

Signed and Sealed this

Fifteenth Day of August, 2006

JON W. DUDAS  
*Director of the United States Patent and Trademark Office*